US 6,683,780 B2

(12) United States Patent
Thomas et al.

(10) Patent No.: US 6,683,780 B2
(45) Date of Patent: Jan. 27, 2004

(54) CAPACITIVE DISPLACEMENT SENSOR

(75) Inventors: David Kenneth Thomas, Bristol (GB); Andrew Loach, Bristol (GB); Graham Richard Ferguson, Stroud (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/239,163

(22) PCT Filed: Jan. 30, 2002

(86) PCT No.: PCT/GB02/00413

§ 371 (c)(1),
(2), (4) Date: Sep. 20, 2002

(87) PCT Pub. No.: WO02/061378

PCT Pub. Date: Aug. 8, 2002

(65) Prior Publication Data

US 2003/0048592 A1 Mar. 13, 2003

(30) Foreign Application Priority Data

Jan. 30, 2001 (GB) .............................................. 0102324

(51) Int. Cl.⁷ ................................................. H01G 7/00
(52) U.S. Cl. ................. 361/283.2; 361/290; 361/298.2; 73/718
(58) Field of Search .............................. 361/283.2, 290, 361/292, 299.4, 298.2; 73/718, 724, 651

(56) References Cited

U.S. PATENT DOCUMENTS

| 2,892,152 | A | 6/1959 | Buisson |
| 3,928,796 | A | 12/1975 | Kaiser |
| 4,303,919 | A | 12/1981 | Dimeff |
| 4,562,430 | A | 12/1985 | Robinson |
| 4,961,055 | A | 10/1990 | Habib et al. |
| 5,006,952 | A | 4/1991 | Thomas |

FOREIGN PATENT DOCUMENTS

| EP | 0 831 300 A2 | 3/1998 |
| WO | WO 00/60307 | 10/2000 |

*Primary Examiner*—Anthony Dinkins
(74) *Attorney, Agent, or Firm*—Oliff & Berridge PLC

(57) ABSTRACT

A displacement responsive device e.g. a measurement probe (110) is disclosed. Displacement of a stylus (130) causes resilient movement of a carriage (134) supported by planar springs (112) and (114). This movement is detected by a capacitance sensor (160), formed from two cylinders (164) and (166). The cylinders move in at least three degrees of freedom and changes in their capacitance during the said movement can be determined by a circuit (e.g. FIG. 5). Movement in x, y and z directions can be sensed.

9 Claims, 10 Drawing Sheets

Fig.3.
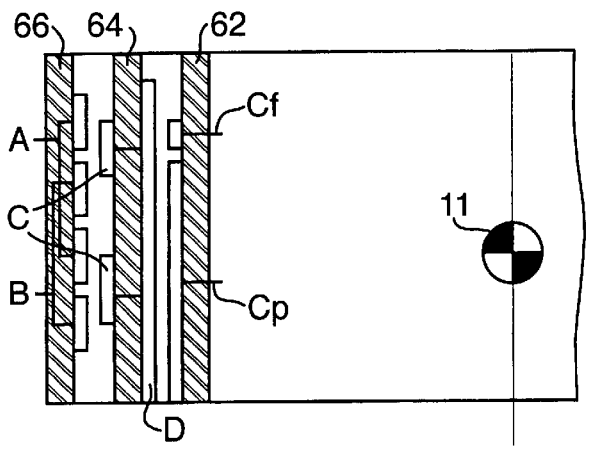
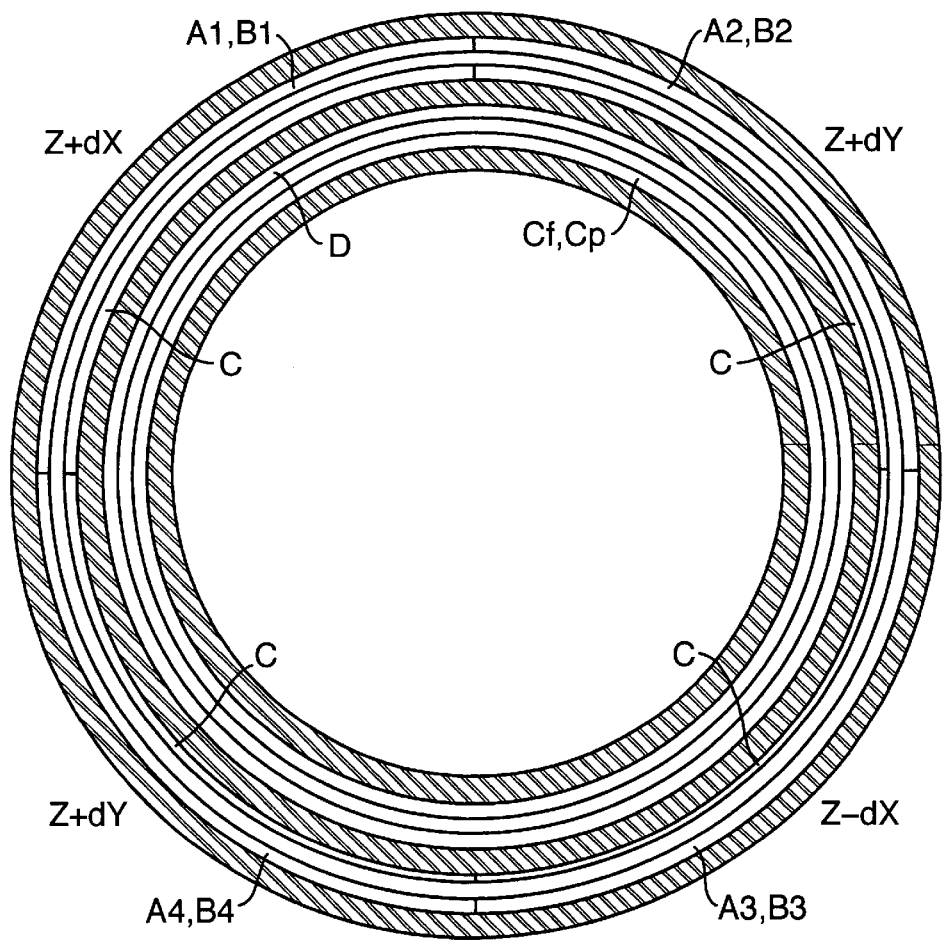

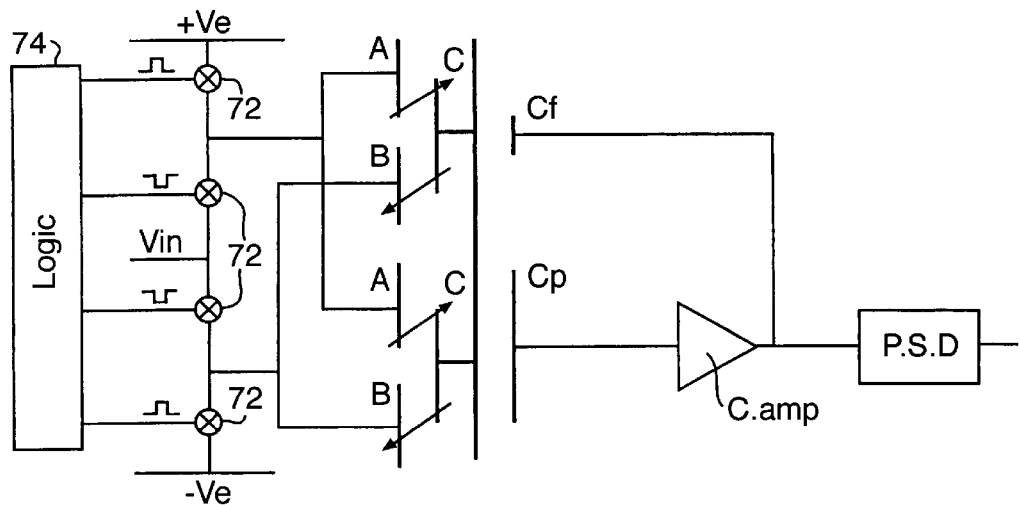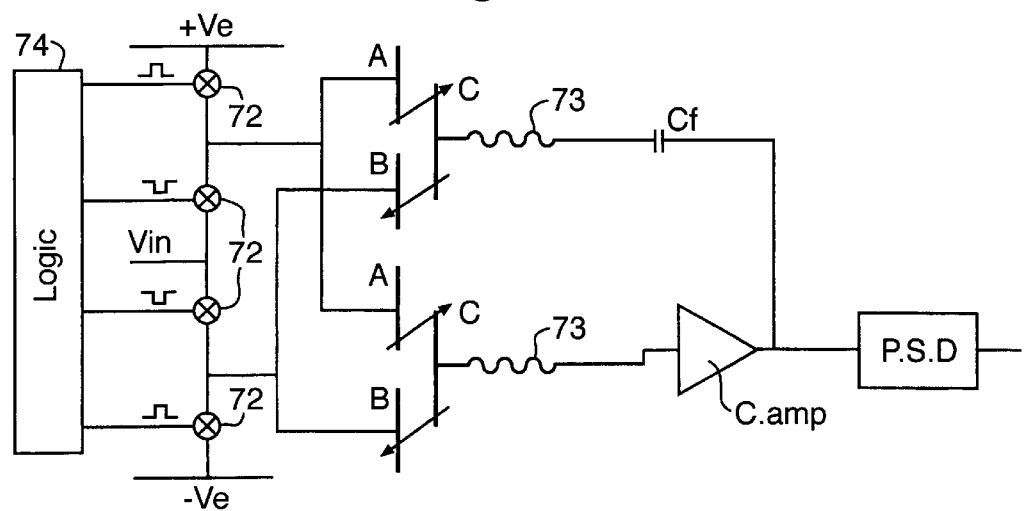

CAPACITIVE DISPLACEMENT SENSOR

BACKGROUND OF THE INVENTION

1. Field of Invention

This invention relates to a capacitance type sensing device which is responsive to displacement.

2. Description of Related Art

Many devices are known which use change in capacitance of a structure as displacement takes place in parts of that structure, in order to measure displacement. One such known device is disclosed in U.S. Pat. No. 5,006,952. That patent discloses a joystick which has spaced flat capacitance plates and a circuit for measuring the change in capacitance of those plates when relative displacement of the plates takes place. The plate arrangement consists of a single circular middle disc sandwiched between two others all separated by an air gap. Movement of the joystick causes the middle disc to move also. However the movement of the middle disc is limited to the width of the air gap. When the middle disc tips from side-to-side about its axis there is little change in the detected capacitance, whereas a relatively large change in capacitance takes place when the middle disc moves in the direction of its axis. Such a marked difference in the response to displacement in the two different directions causes problems because the joystick will respond with different capacitance changes when pushed in different directions.

Cylindrical capacitance type displacement measurement devices have been disclosed e.g. European Patent No. 0831300, U.S. Pat. No. 4,961,055 and U.S. Pat. No. 3,928,796. In each of these prior art disclosures the devices are intended to operate such that respective cylindrical parts move axially so that there is no change in the size of the dielectric between those parts.

SUMMARY OF THE INVENTION

The present invention according to a first aspect provides a displacement responsive device comprising a first member and a second member displaceable with at least three degrees of freedom with respect to the first member and comprising a capacitance displacement sensor having at least two capacitive elements in spaced relation, one of the elements being connected to the first member and the other of the elements being connected to the second member such that the two elements are displaceable with respect to each other in the said at least three degrees of freedom so as to vary their capacitance, the invention being characterised in that the elements are in the form of at least two substantially coaxial tubes one of which is disposed within the other.

Preferably the tubes are two generally concentric cylinders. Alternatively there are three tubes, a central tube and two others one inside the central tube and one outside the central tube.

The invention relates also to an arrangement of springs which form a suspension system for a displacement responsive device, e.g. a measurement probe.

Such an arrangement in a probe is known for example from International Publication No. WO00/60307, in which there is described a measuring probe having a stylus holder mounted for pivoting motion and axial translation on a pair of axially separated planar springs which extend between the stylus holder and the probe housing. The stylus holder pivots about a point on the probe axis, and which is positioned somewhere between the planes of the two springs depending on the relative stiffnesses of the two springs. Additionally it is suggested in this publication that a third spring could be added which also extends between the stylus holder and the housing in a plane through the pivot point of the stylus holder.

Thus according to a second aspect of the invention there is provided a suspension system for a displacement responsive device in which a stylus holder is suspended within the housing by means of an alternative arrangement of springs.

In a preferred embodiment of the invention the springs are planar springs.

Also in a preferred embodiment of the invention the suspension system comprises three planar springs.

Preferably the probe additionally includes an overtravel device, which may be a kinematic overtravel device known per se, to protect the spring suspension against overstressing of the springs during large movements of the stylus in a probing operation.

The overtravel mechanism is preferably disposed within the spring suspension system.

BRIEF DESCRIPTION OF THE DRAWINGS

The invention will now be described with respect to the drawings, wherein:

FIGS. 2 and 3 show the components of the capacitance sensor illustrated in FIG. 1;

FIG. 4 shows part of a signal conditioning circuit for use with the present invention;

FIG. 5 shows a modified capacitance sensor and part of a signal conditioning circuit;

DETAILED DESCRIPTION OF PREFERRED EMBODIMENTS

Figure 1:
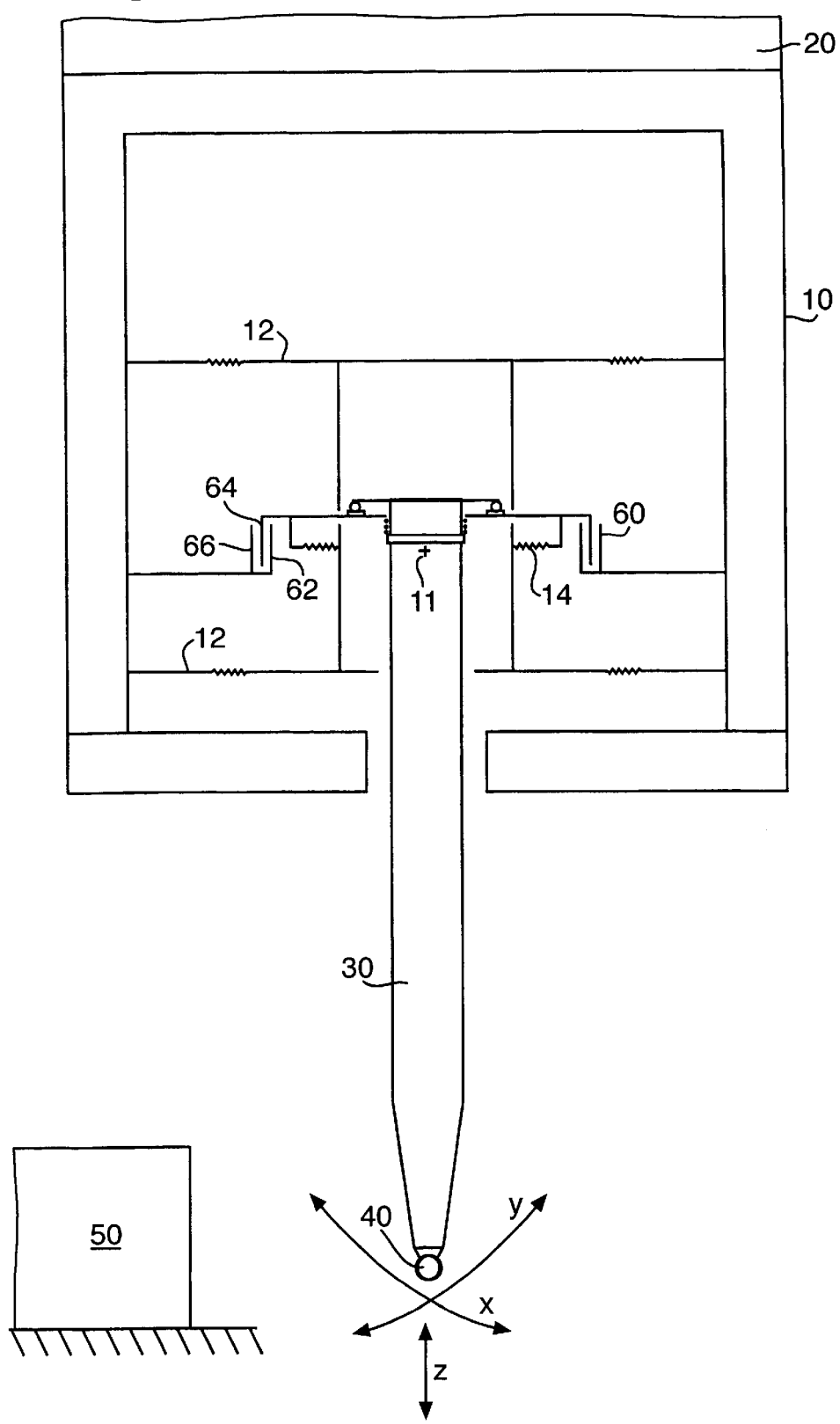
FIG. 1 shows a simplified drawing of an embodiment of the invention.

FIG. 1 shows a displacement responsive device which embodies the invention. The device is a measurement probe 10, attached to a machine 20 e.g. a coordinate measurement machine or a machine tool. A stylus 30 has a tip 40 which in use may engage a surface e.g. of workpiece 50. Surface engaging forces exerted on the stylus tip caused the stylus 20 to move. As a consequence of the spring arrangement of this embodiment discussed below, the stylus has three degrees of freedom, two rotational (x and y) and one translational (z). The stylus is connected to a capacitance sensor 60 which can be used to determine that movement of the stylus has taken place and/or the amount of movement that has taken place. Thus a simple trigger signal can be produced or an analogue type signal can be produced to aid profile scanning say.

The spring arrangement comprises two spaced and parallel diaphragms 12 which permit resilient translational movement of the stylus 30 in the z direction, and a further slightly stiffer flat spring 14 which allows the stylus tip to move in a spherical plane having a central point at cross 11 which lies approximately in the plane of the flat spring 14. Thus the spring arrangement shown allows three degrees of freedom.

Figure 2:
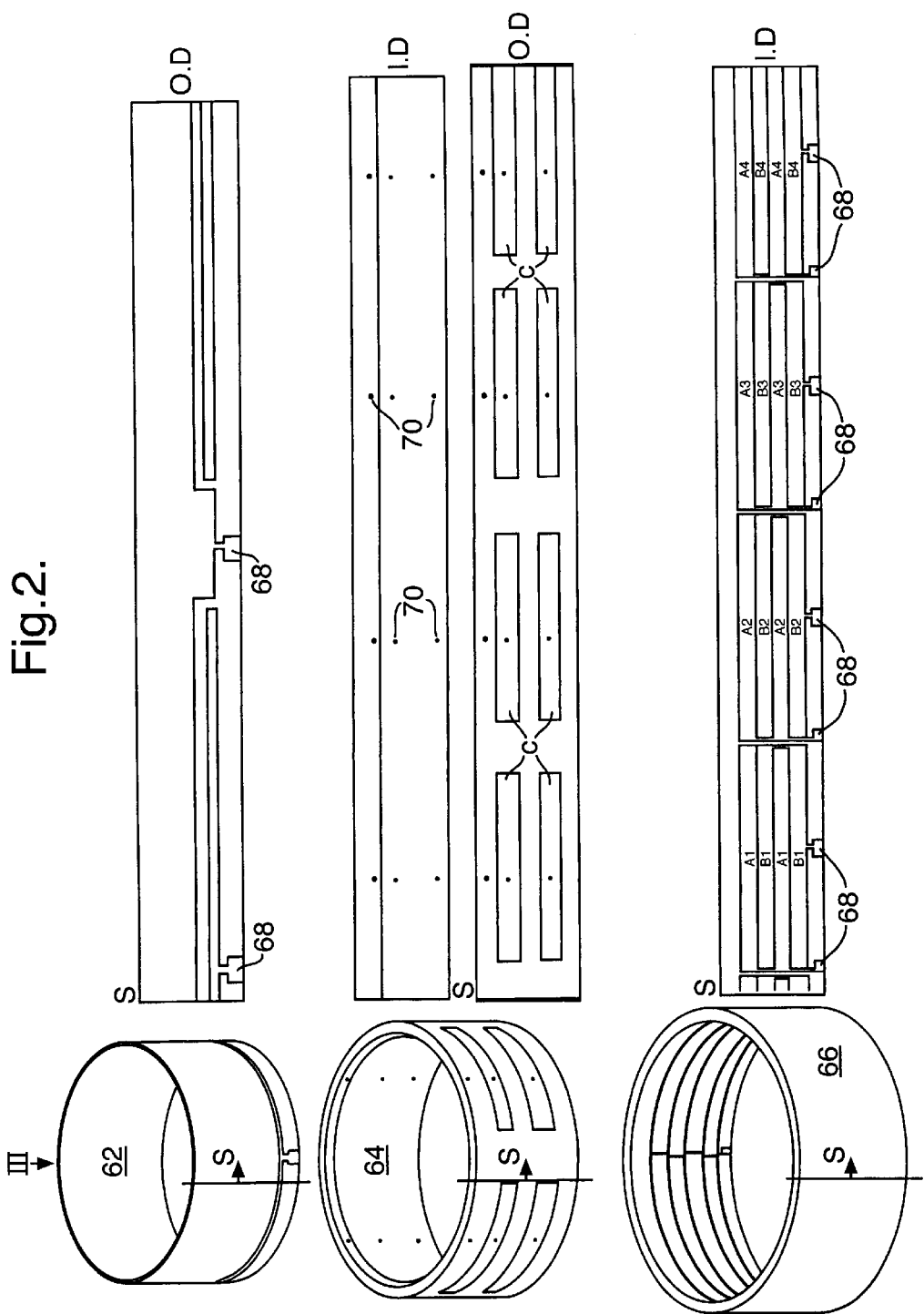

Referring now to FIGS. 1, 2 and 3, the capacitance sensor is formed from three concentric ceramic cylinders 62, 64 and 66. The cylinders 62, 64 and 66 are each formed from a ceramic material metallised with copper and overcoated with gold to a total metal coating thickness of approximately two microns. This coating is then through-etched so that discrete capacitive areas are formed in the coating, some of which have electrical connections 68 incorporated. Movement of the stylus causes resilient movement of the middle capacitance cylinder 64. The two relatively fixed inner and outer capacitance cylinders 62 and 66 are spaced from the inner and outer surfaces of the middle cylinder 64 by a dielectric air gap. A change in capacitance will take place when the middle cylinder 64 moves. It will be noted that movement of cylinder 64 will be in the z direction or pivotal about centre 11 with the result that the air gap between the cylinders will not alter significantly. However the conductive layer on the cylinders is divided into segments so that the overlap of the segments will determine the capacitance in the sensor and thereby the movement of the cylinder can be measured by the amount of overlap of the segments. In this way a greater range of travel between the cylinders is possible than was possible when flat plates were used in the prior art.

One example of a particular pattern of conductive areas on the cylinders 62,64 and 66 is illustrated in FIG. 2. FIG. 2 is an exploded view of the cylinders of the capacitance sensor 60 shown in FIG. 1.

Also shown in FIG. 2 are the developed surfaces of the cylinders showing clearly the pattern of the discrete capacitance areas.

FIG. 3 shows a view in the direction of arrow 3 in FIG. 2 and a detailed section through the sensor is shown.

The metallised areas A,B and C are shown much thicker than they would be in practice.

The static outer cylinder 66 has four annuli each divided into four quadrants A1B1,A2B2,A3B3 and A4B4, each of these is connected to a signal conditioning circuit which will be described below. Voltage is produced by the circuit to provide a capacitance charge which varies according to the degree of overlap between the areas A,B and C. The movable middle cylinder 64 has no electrical connections but its outer surface is electrically connected to its inner surface via through holes 70. The eight discrete areas C of the middle cylinder overlap a pair of quadrants A and B so that a change in the amount of overlap causes a change in the capacitance. As discussed above a change in overlap occurs during z,y or x movement. Quadrants are used so that the signal circuit can determine in which direction the middle cylinder (and hence the stylus) is being moved.

FIG. 4 shows a circuit for the capacitance sensor 60 in FIGS. 1–3. In operation the sensor is charged with a stepped voltage via switching circuits 72 driven by logic 74. The capacitive areas, one set only of which is shown in the Figure, are thus alternately charged and their charge is amplified by a charge amplifier c.amp and the phase of charge is determined by a phase sensitive device p.s.d.

A detailed description of one possible circuit for use with the invention is disclosed in U.S. Pat. No. 5,006,952 and that disclosure is incorporated herein by reference.

Two additional capacitances are shown in this embodiment, Cf and Cp. Cf is a feedback capacitance for the charge amplifier, and Cp is a pick-off capacitance. Both are formed on the inner cylinder 62. Thus no electrical connections are formed on the moving cylinder 64. The capacitances Cf and Cp have the same dielectric (i.e. air) as the other capacitances of the sensor, and so any changes in the dielectric constant of the air will affect all the capacitances equally and thus will have little net effect.

In this variant there will be four channels, one for each of the quadrants of the sensor. In this way the direction in x or y of the movement of the stylus can be determined from the change in capacitance of each quadrant. A circuit suitable for this embodiment having four channels is disclosed also in U.S. Pat. No. 5,006,952.

Another variant of the invention is shown in FIG. 5. In this variant only two cylinders are used. The principle of operation is as discussed previously with the exception that capacitors Cf and Cp are not present on the sensor. Instead capacitor Cf is mounted externally of the sensor in the signal conditioning circuit and capacitor Cp is not required. Whilst this sensor is simpler in construction (there are only two cylinders) a disadvantage of the construction is that a flexible electrical connection 73 is required to the moving (e.g. inner) cylinder.

The circuit shown in FIG. 5 is essentially no different to the circuit of FIG. 4 or to the circuit disclosed in U.S. Pat. No. 5,006,952.

Figure 6:
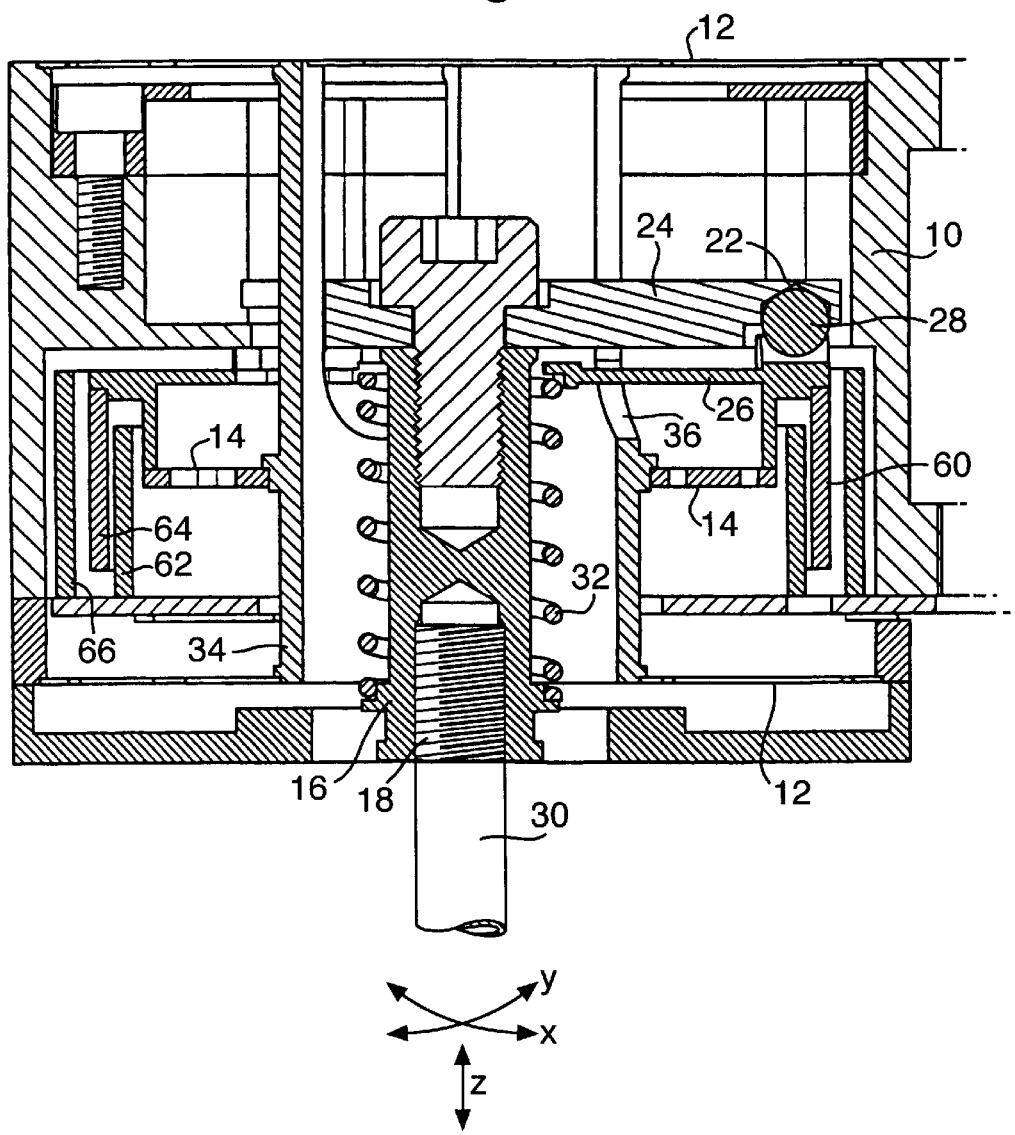
FIG. 6 shows a section through a measurement probe, and illustrates the second aspect of the invention.

FIG. 6 shows a section through a displacement responsive device, in this instance a measurement probe. This probe is similar to the probe shown in FIG. 1 and has like reference numerals denoting like parts.

The probe has a housing 10 from which extends a workpiece-contacting stylus 30. A screw thread connection 18 connects the stylus 30 to a stylus holder 16. The stylus holder 16 is supported by means of a kinematic support consisting of three vee-grooves 22 disposed at intervals of 120° around a plate 26. Each groove 22 provides a seating for a ball 28 fixed to a mounting 24 which in turn is connected to the stylus holder 16. A coil spring 32 which acts in compression between the mounting 24 and the stylus holder 16 provides a force for urging the balls 28 into the grooves 22 and thus holding fast the stylus holder 16 to the plate 26.

The kinematic support provides an overtravel mechanism which will break-out and allow a ball or balls to lift from their respective seating when travel of the stylus holder reaches an unacceptable amount; thereby protecting the remainder of the stylus holder suspension mechanism. Forces exerted on the stylus cause spring 32 to compress and thus a ball or balls 28 will lift from their seating and cylinder 64 is not forced into contact with its adjacent cylinders 62 and 66.

Plate 26 moves (in normal operation) with the stylus 30 and is connected directly to a displacement sensor 60. In this instance a capacitance sensor 60 is shown (and is constructed as described above) but any displacement sensor could be employed here.

The plate is resiliently suspended on a barrel 34 via a flat planar spring 14. This spring allows pivotal movement of the stylus holder about a point central to the stylus holder, in x and y directions.

The barrel 34 has slots 36 to permit legs of mounting 24 and plate 26 to pass unhindered. The barrel is suspended at each end by two further planar springs 12 which allow the barrel and the components it supports to move only in the z direction.

The displacement sensor has components (cylinders 62 and 66) fixed to the housing 10 and a further component (cylinder 64) suspended for movement in the x and y directions by spring 14 and in the z direction by parallel springs 12.

This arrangement of probe allows a compact construction.

Figure 7:
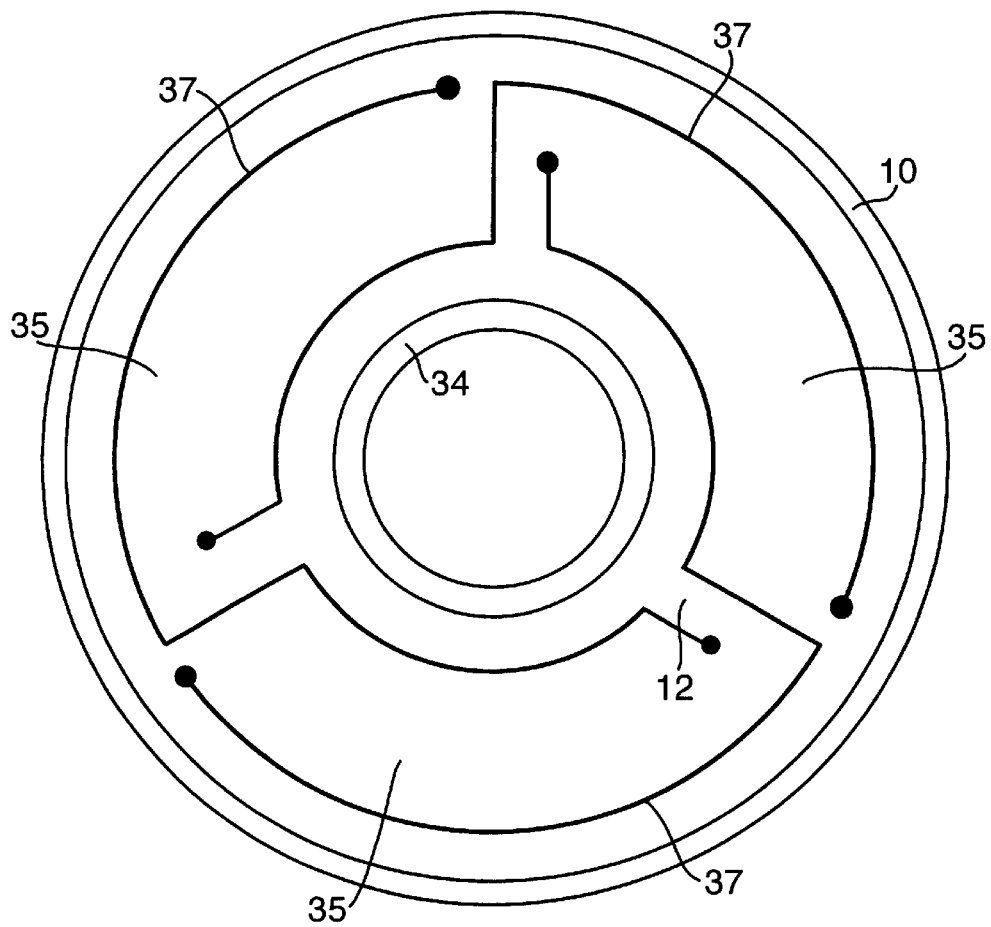
FIG. 7 shows a spring component of the measurement probe shown in FIG. 6.
Figure 8:
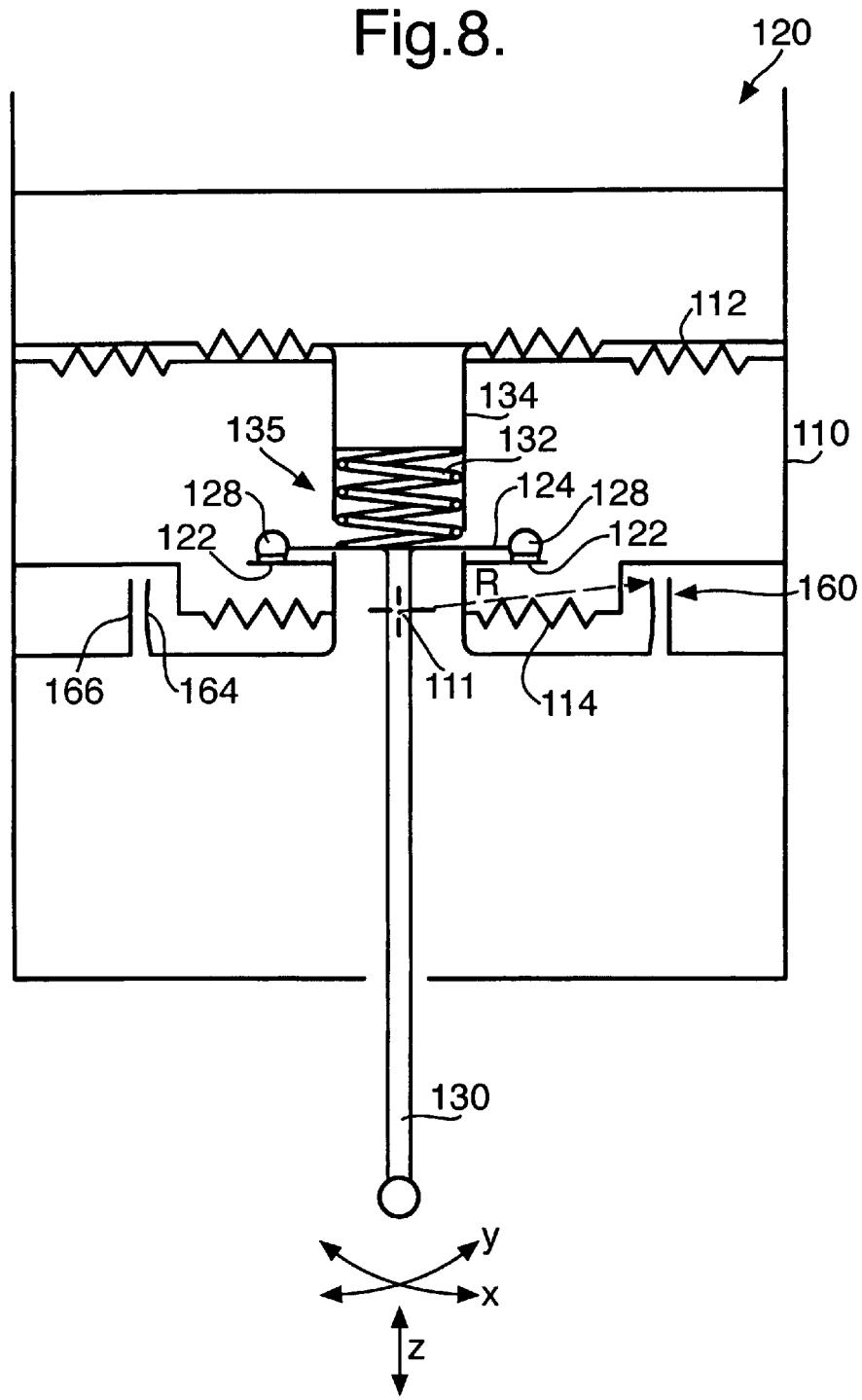
FIGS. 8 to 12 illustrate a further embodiment of the invention.
Figure 11:
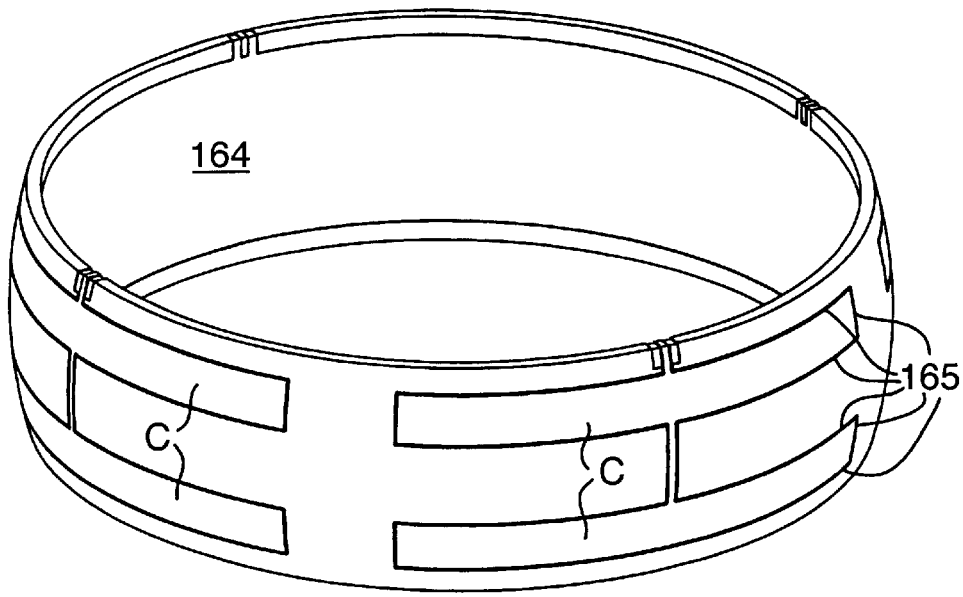
Figure 12:
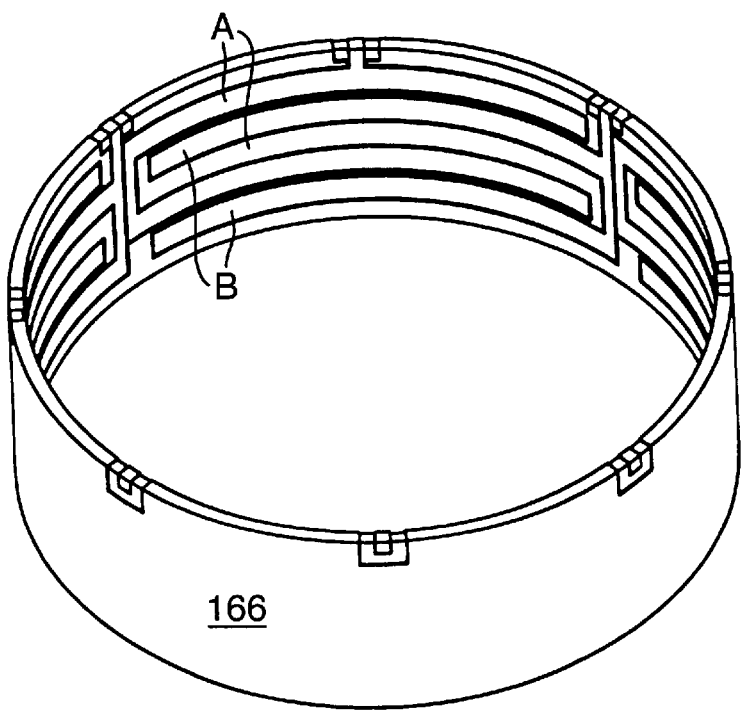

The construction of the springs 12 is as shown in FIG. 7. The inner and outer peripheries are welded to the barrel 34 and housing 10 respectively. Each spring 12 has an "Isle of Man" construction having three legs 35 extending generally circumferentially and radially outwardly. The legs 35 are formed by through-etching three tracks 37 in the material of the spring. FIG. 8 shows a simplified schematic diagram of the arrangement shown in FIG. 9. FIGS. 10, 11 and 12 are enlarged views of parts of the embodiment shown in FIG. 8 and 9.

FIG. 8 shows another measurement probe 110. It has a stylus 130 which is mounted on a sprung carriage 134. The movement of this carriage relative to a machine 120 to which it is mounted can be determined using a capacitance sensor 160. The sensor 160 in this instance comprises two tubes 164 and 166, in the form of two concentric cylinders, described in detail below.

This embodiment has a different spring arrangement to the embodiment shown in FIGS. 1 and 6. In this embodiment a parallel pair of planar springs 112 is used to provide a relatively high degree of stiffness to movement in the x or y directions, but giving compliance in the z direction. This spring pair 112 could be replaced by a single thicker spring, however, since through etching works best on thin material, then it is cheaper to make two thin springs as shown, rather than, pressing say, a thicker single spring.

A further planar spring 114 supports a lower end of the carriage 134. This further spring provides resistance to movement of the carriage/stylus in the x,y and z directions. The spring configuration allows pivoting of the stylus about a notional point 111 as well as movement of the stylus in the z direction. Differential movement of plates 164 and 166 causes a change in capacitance between them which can be detected e.g. using the circuit shown in FIG. 5.

An overtravel mechanism 135 in the form of a sprung kinematic mount is provided in this embodiment also. Spring 132, at one end acts against the carriage 134 and, at its other end forces plate 124 supporting three balls 128 against complimentary vee grooves 122 supported on the carriage 134. The forced-together ball/vee groove arrangement operates as detailed above.

Figure 9:
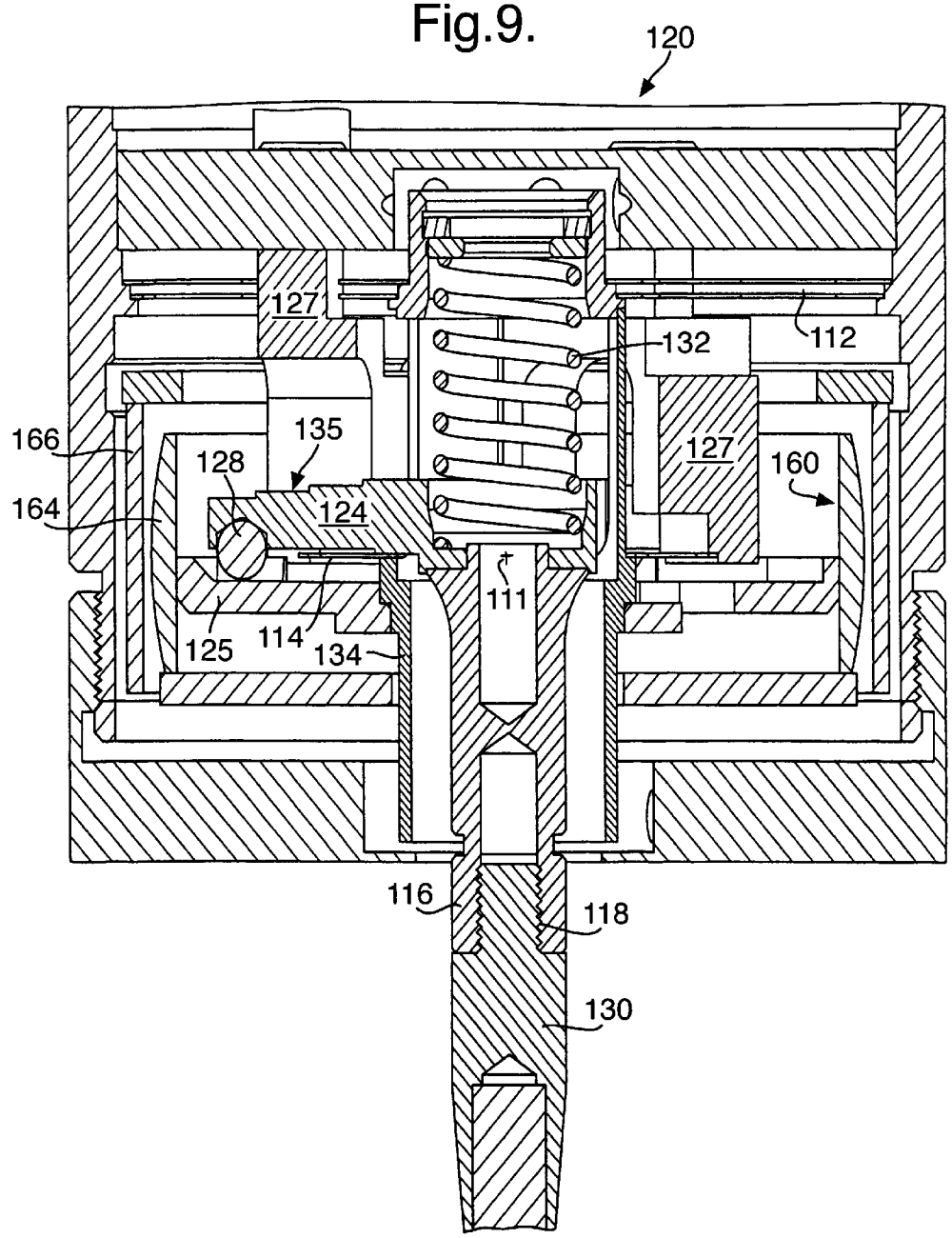
Figure 10:
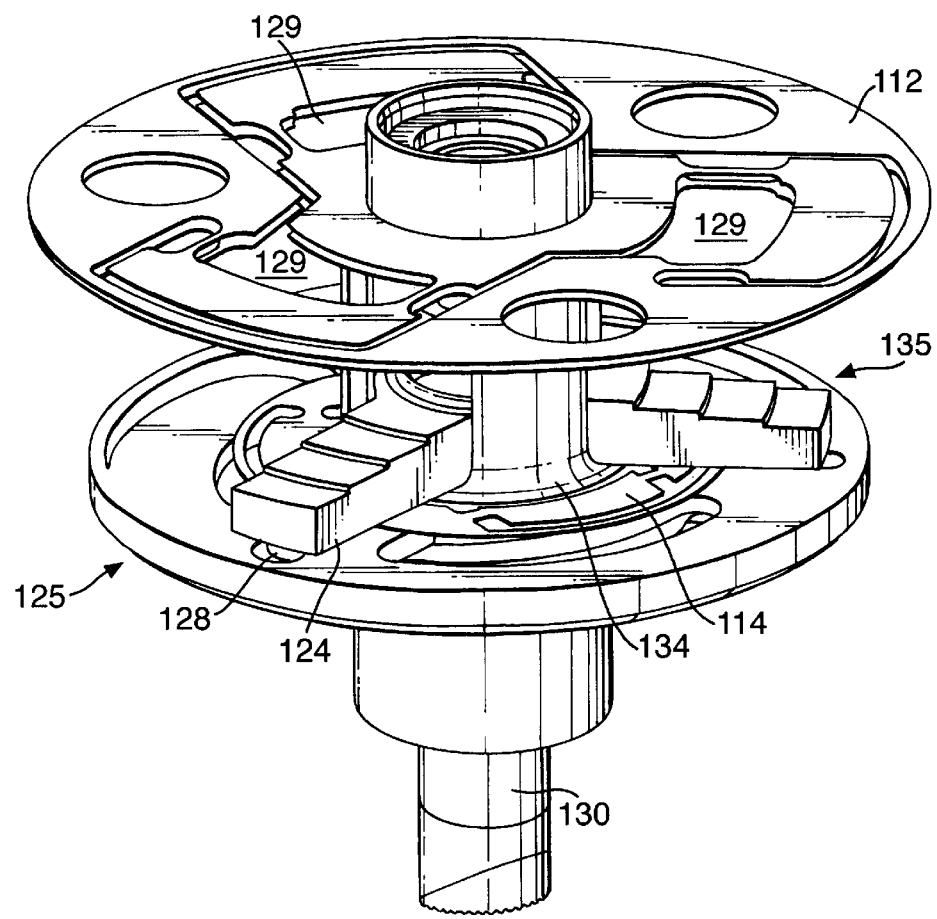

FIG. 9 shows a section through a probe constructed to the scheme shown in FIG. 8 and FIG. 10 shows an enlargement of parts of the probe shown in FIG. 9. This probe operates in a manner similar to that of the probe illustrated in FIGS. 1–7 and described above, having the same three degrees of freedom. Plate 124 extends outwardly between gaps in the carriage 134. A support 127 for lower spring 114 extends downwardly between gaps 129 in upper spring 112.

The capacitance sensor 160 is shown in FIG. 9 but is omitted from FIG. 10 for clarity. Inner cylinder 164 is supported on a mounting 125 affixed to carriage 134. Outer cylinder 166 is connected to the probe's body. Operation of the sensor 160 is as detailed above. FIG. 5 shows a suitable two-cylinder circuit.

FIGS. 11 and 12 show the two cylinders 164 and 166 enlarged. The patterns of conductive material A,B and C on the cylinders is the same as that on cylinders 164 and 166 described above. In this instance a cylinder equivalent to cylinder 62 is not present and so flexible connections (73 FIG. 5) to area C on cylinder 164 are required.

It will be noted that, rather than being flat inner cylinder 164 has a barrelled outer periphery with a radius R (FIG. 8) centred approximately at the centre of xy rotation 111 of the sensor 160. Barrelling allows the dielectric gap between the two cylinders 164 and 166 to be smaller and so a higher capacitance can be achieved. Cross-talk between the x,y and z axes is reduced also. In order to achieve the curved interruptions 165 in the conductive material coated on the inner cylinder 164, a laser etching technique is used. The technique may be used for the outer cylinder 166 also.

It will be apparent to the skilled addressee that many modifications and variants to the embodiments shown are possible. The invention is described with reference to a displacement sensing probe with a stylus tip, however, any multi-axis measuring or touch sensing device may make use of the invention. The probes shown use springs for resilient movement and support of the capacitance sensor however, other constructions could be employed e.g. rubber blocks, slideways or parallel action mechanisms. Sensor cylinders (62,64 and 66) are described and illustrated however, any tubular shaped elements would work satisfactorily e.g. square tube, hexagonal tube or any irregular shaped tube. The embodiment shown in FIGS. 8–12 has a sensor cylinder 164 having a barrelled outer surface, however, a cylinder which tapers toward each of its ends will give equally good results. The conductive parts of the sensors shown in each embodiment are shown facing each other. The sensors will perform well if those conductive parts are disposed on surfaces which are not facing each other. Such a configuration may be required to reduce production costs. In the second embodiment the movable cylinder 164 could be on the outside, in which case the static cylinder may be barrelled.

The sensors 60 and 160 are shown having conductive quadrants, whereas two or more conductive sectors e.g. three sectors could be used with suitable alteration of the circuits of FIG. 4 or 5.

What is claimed is:

1. A measurement probe including a displacement responsive device, the device comprising a first member and a second member displaceable with at least three degrees of freedom with respect to the first member and comprising a capacitance displacement sensor having at least two capacitive elements in spaced relation, one of the elements being connected to the first member and the other of the elements being connected to the second member such that the two elements are displaceable with respect to each other in the said at least three degrees of freedom so as to vary their capacitance, characterised in that the elements are in the form of at least two substantially coaxial tubes one of which is disposed within the other.

2. A measurement probe as claimed in claim 1 wherein the tubes are generally concentric cylinders.

3. A measurement probe as claimed in claim 2 wherein the cylinders comprise a static outer cylinder and an inner cylinder movable in the said at least three degrees of freedom relative to the static cylinder.

4. A measurement probe as claimed in claim 3 wherein the inner cylinder has an outer surface which is part-spherical of barrelled profile.

5. A measurement probe as claimed in claim 1 wherein one of the tubes or the movable cylinder has a resilient support.

6. A measurement probe as claimed in claim 5 wherein the resilient support is in the form of two or more spaced planar springs configured to allow the said at least three degrees of freedom.

7. A displacement responsive device as claimed in claim 2 wherein one of the tubes or the movable cylinder has a resilient support.

8. A displacement responsive device as claimed in claim 3 wherein one of the tubes or the movable cylinder has a resilient support.

9. A displacement responsive device as claimed in claim 4 wherein one of the tubes or the movable cylinder has a resilient support.

\* \* \* \* \*